(12) United States Patent
Nishimura

(10) Patent No.: US 8,949,779 B2
(45) Date of Patent: Feb. 3, 2015

(54) SERVICE COMBINATION SUPPORT APPARATUS, SERVICE COMBINATION SUPPORT METHOD, AND STORAGE MEDIUM

(75) Inventor: Shoji Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 970 days.

(21) Appl. No.: 12/991,782

(22) PCT Filed: May 14, 2009

(86) PCT No.: PCT/JP2009/002104
§ 371 (c)(1),
(2), (4) Date: Nov. 9, 2010

(87) PCT Pub. No.: WO2009/139165
PCT Pub. Date: Nov. 19, 2009

(65) Prior Publication Data
US 2011/0066582 A1    Mar. 17, 2011

(30) Foreign Application Priority Data
May 14, 2008 (JP) .................... 2008-127040

(51) Int. Cl.
*G06F 9/44* (2006.01)
*G06F 17/30* (2006.01)

(52) U.S. Cl.
CPC .................. *G06F 17/3089* (2013.01)
USPC ........................... 717/107; 717/104

(58) Field of Classification Search
USPC ........................................ 717/107
See application file for complete search history.

(56) References Cited

U.S. PATENT DOCUMENTS

| 5,261,043 A * | 11/1993 | Wolber et al. ................. 715/809 |
| 5,890,155 A * | 3/1999 | Steinman et al. ..................... 1/1 |
| 2005/0076311 A1 * | 4/2005 | Kusterer et al. ............... 715/853 |

(Continued)

FOREIGN PATENT DOCUMENTS

| JP | 62-256133 A | 11/1987 |
| JP | 2001-273170 A | 10/2001 |

(Continued)

OTHER PUBLICATIONS

Karakoc, E.; Kardas, K.; Senkul, P., "A Workflow-Based Web Service Composition System," Web Intelligence and Intelligent Agent Technology Workshops, 2006. Wi-IAT 2006 Workshops. 2006 IEEE/WIC/ACM International Conference on, pp. 113-116, Dec. 2006.*

(Continued)

*Primary Examiner* — James D Rutten
(74) *Attorney, Agent, or Firm* — Sughrue Mion, PLLC

(57) ABSTRACT

A service combination proposing unit (12) inquires of a data item relationship inferring unit (13) about a data item connectable to a specific data item. The data item relationship inferring unit 13 infers a data item connectable to the specific data item based on pairs of output data items and input data items that are registered in a data item relationship storage unit (32) and have already been determined to be connectable and based on inference rules registered in an inference rule storage unit (33). The data item relationship inferring unit (13) then returns the inferred data item to the service combination proposing unit (12). The service combination proposing unit (12) presents the returned data item to a developer or the like.

14 Claims, 14 Drawing Sheets

(56) References Cited

U.S. PATENT DOCUMENTS

| | | | |
|---|---|---|---|
| 2006/0136422 A1* | 6/2006 | Matveief et al. | 707/10 |
| 2007/0089117 A1* | 4/2007 | Samson | 719/330 |
| 2007/0294670 A1* | 12/2007 | Hisaki | 717/120 |
| 2008/0271008 A1* | 10/2008 | Dettori et al. | 717/168 |

FOREIGN PATENT DOCUMENTS

| | | | |
|---|---|---|---|
| JP | 2004302790 A | 10/2004 | |
| JP | 2007334627 A | 12/2007 | |
| JP | 2008021095 A | 1/2008 | |

OTHER PUBLICATIONS

Japanese Office Action for JP Application No. 2010-511887 mailed on Jul. 30, 2013 with Partial English Translation.

International Search Report for PCT/JP2009/002104 mailed Jun. 9, 2009.

T. Moriya et al., "A Study on Mediation for Service Composition", IEICE Technical Report, vol. 106, No. 577, Mar. 1, 2007, pp. 89-94.

* cited by examiner

FIG. 2

SERVICE COMBINATION DEFINITION STORAGE UNIT ~31

```
1 : serviceA= 'http://www.example.com/serviceA/'
2 : serviceX= 'http://www.otherexample.com/serviceX/'
3 :
4 : resA=GET serviceA
5 :
6 : reqX.name=resA. namae
7 : resX=POST serviceX reqX
         ⋮
```

| OUTPUT-SIDE DATA ITEM SPECIFIC INFORMATION | INPUT-SIDE DATA ITEM SPECIFIC INFORMATION |
|---|---|
| serviceA/output/namae | serviceX/input/name |
| serviceB/output/shimei | serviceX/input/name |
| serviceB/output/shimei | serviceY/input/hatsumeisha |

FIG. 7 resA = GET serviceA reqY. hatsumeisha = resY = POST serviceY reqY

FIG. 8

| Data items connectable to "serviceY/input/hatsumeisha" are as follows. |
|---|
| ① serviceA/output/namae (inferred) |
| ② serviceB/output/shimei (retrieved) |

FIG. 11

```
resA = GET serviceA
reqX.name = resA. namae
reqX.address = resA. jyusho
resX = POST serviceX reqX
```

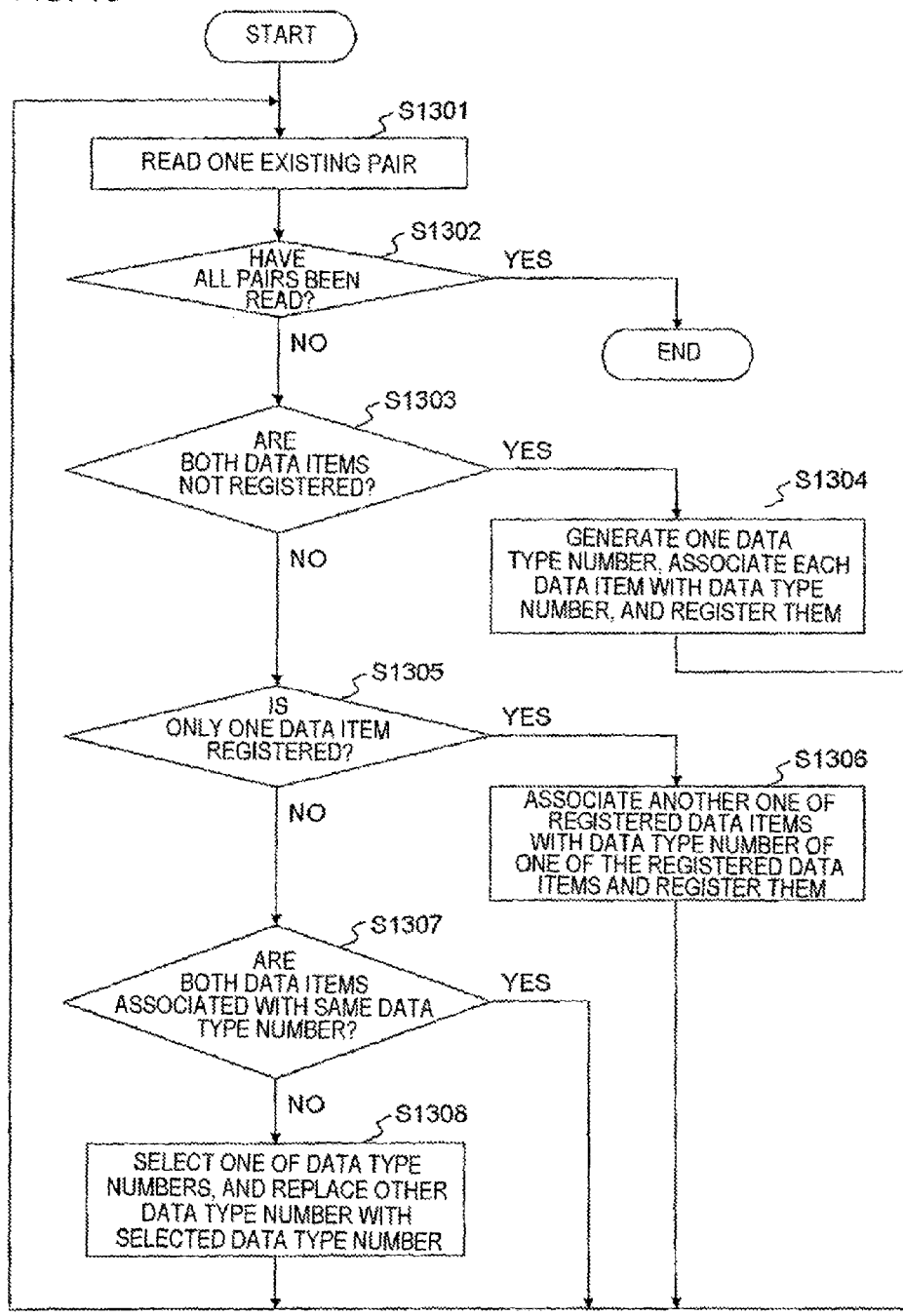

FIG. 14

| DATA ITEM SPECIFIC INFORMATION | DATA TYPE NUMBER |
|---|---|
| serviceA/output/namae | 1 |
| serviceX/input/name | 1 |

(A)

| DATA ITEM SPECIFIC INFORMATION | DATA TYPE NUMBER |
|---|---|
| serviceA/output/namae | 1 |
| serviceX/input/name | 1 |
| serviceB/output/shimei | 1 |

(B)

| DATA ITEM SPECIFIC INFORMATION | DATA TYPE NUMBER |
|---|---|
| serviceA/output/namae | 1 |
| serviceX/input/name | 1 |
| serviceB/output/shimei | 1 |
| serviceY/input/hatsumeisha | 1 |

(C)

SERVICE COMBINATION SUPPORT APPARATUS, SERVICE COMBINATION SUPPORT METHOD, AND STORAGE MEDIUM

This application is the National Phase of PCT/JP2009/002104, filed May 14, 2009, which is based upon and claims the benefit of priority from Japanese patent application No. 2008-127040, filed on May 14, 2008, the disclosure of which is incorporated herein in its entirety by reference.

TECHNICAL FIELD

The present invention relates to a service combination technique for realizing a new service by combining a plurality of existing services. More particularly, the present invention relates to a service combination support apparatus, a service combination support method and a storage medium that support creation of a service combination definition that defines the data flow among services.

BACKGROUND ART

A "service combination" is about realizing a new service by combining services among a plurality of existing services with the use of all of or part of the output data of a service as the input data of another service. Examples of services to be realized through the service combination include a business process created by joining web services, such as WS-BPEL (Web Services Business Process Execution Language), and a mashup service created by using web APIs.

To realize a new service by using a service combination technique, it is necessary to create a service combination definition that define a data flow among services. Conventionally, a developer refers to each service definition, and creates a service combination definition while checking data items connectable among respective services. Therefore, There is a problem that a service combination definition cannot be created with high efficiency.

To solve this problem, the following technique has been suggested (see Patent Document 1, for example). As shown in FIG. 15, the technique disclosed in Patent Document 1 involves an input/output combination generating unit 100 and a service connection history storage unit 101. The connection history of the input/output data about the services in the past software design is stored in the service connection history storage unit 101. Upon receiving a service process flow 102 defining the execution sequence of services and a service ID 103 indicating a specific service among the services, the input/output combination generating unit 100 selects combinations with high connection probabilities from the combinations of the input data item of the service specified by the service ID and the output data items of other services, based on the service connection history registered in the service connection history storage unit 101, and outputs the selected combinations as an input/output combination list 104.

Also, as a technique for linking a plurality of services, the following technique is known (see Patent Document 2, for example). As shown in FIG. 16, the technique stated in Patent Document 2 involves a data associating unit 300, an application definition storage unit 301, a data association storage unit 302, and a dictionary storage unit 303. The output item names of output data and the input item names of input data are stored in the application definition storage unit 301 for respective applications. Using the dictionaries registered in the dictionary storage unit 303, the data associating unit 300 extracts combinations of input item names and output item names with identical or similar meanings from the item names registered in the application definition storage unit 301, and stores the combinations into the data association storage unit 302. At this point, the data associating unit 300 also registers application names that indicate which item name is related to which application. When a pair 304 of an input item name and an application name is input, a pair 305 of an output item name and an application name registered and associated with the pair is retrieved from the data association storage unit 302, and is then output.

[Patent Document 1] Japanese Laid-Open Patent Publication No. 2007-334627

[Patent Document 2] Japanese Laid-Open Patent Publication No. 2004-302790

DISCLOSURE OF THE INVENTION

According to each technique stated in Patent Documents 1 and 2, data items connectable to a designated specific data item are retrieved only based on the existing pairs (combinations) of output data items and input data items that are registered in the service connection history storage unit or the data association storage unit, and have already been determined to be connectable. Therefore, there is a problem that only some of the data items connectable to a designated specific data item can be retrieved.

Therefore, an object of the present invention is to retrieve data items connectable to a designated specific data item not only from the existing pairs of output data items and input data items that have already been determined to be connectable, but also from pairs of output data items and input data items that have not been determined to be connectable at present and can be inferred from the existing pairs.

According to the present invention, there is provided a first service combination support apparatus including a data item relationship inferring unit that generates a new pair that differs from a plurality of existing pairs and is formed with an output data item included in a first pair and an input data item included in a second pair, when the output data item included in the first pair and the input data item included in the second pair correspond to each other among the existing pairs each formed with an output data item and an input data item associated with each other by a service combination definition that defines a data flow among a plurality of web services connectable to one another.

According to the present invention, there is provided a first service combination support method including a data item relationship inferring step that generates a new pair that differs from a plurality of existing pairs and is formed with an output data item included in a first pair and an input data item included in a second pair, when the output data item included in the first pair and the input data item included in the second pair correspond to each other among the existing pairs each formed with an output data item and an input data item associated with each other by a service combination definition that defines a data flow among a plurality of web services connectable to one another.

According to the present invention, there is provided a first computer-readable storage medium storing a program for causing the computer to perform a data item relationship inferring operation to generate a new pair that differs from a plurality of existing pairs and is formed with an output data item included in a first pair and an input data item included in a second pair, when the output data item included in the first pair and the input data item included in the second pair correspond to each other among the existing pairs each formed with an output data item and an input data item associated with each other by a service combination definition that defines a data flow among plurality of web services connectable to one another.

According to the present invention, data items connectable to a designated specific data item can be retrieved not only from the existing pairs of output data items and input data items that have already been determined to be connectable, but also from pairs of output data items and input data items that have not been determined to be connectable at present and can be inferred from the existing pairs.

BRIEF DESCRIPTION OF THE DRAWINGS

The above mentioned objects and other objects, and features and advantages of the present invention will become more apparent by the following exemplary embodiments and the following drawings associated therewith.

FIG. 2 is a diagram showing an example of the contents of the service combination definition storage unit;

FIG. 3 is a diagram showing an example of the contents of the data item relationship storage unit;

FIG. 7 is a diagram showing an example of a service combination definition under development;

FIG. 8 is a diagram showing an example of the contents of a proposal;

FIG. 11 is a diagram showing another example of a service combination definition under development;

FIG. 13 is a flowchart showing an example of the operation of the inferring unit;

FIG. 14 is a diagram showing a situation where information is accumulated in the inference result storage unit;

BEST MODE FOR CARRYING OUT THE INVENTION

The following is a detailed description of exemplary embodiments for carrying out the present invention, with reference to the accompanying drawings.

[First Exemplary Embodiment of the Invention]

Figure 1:
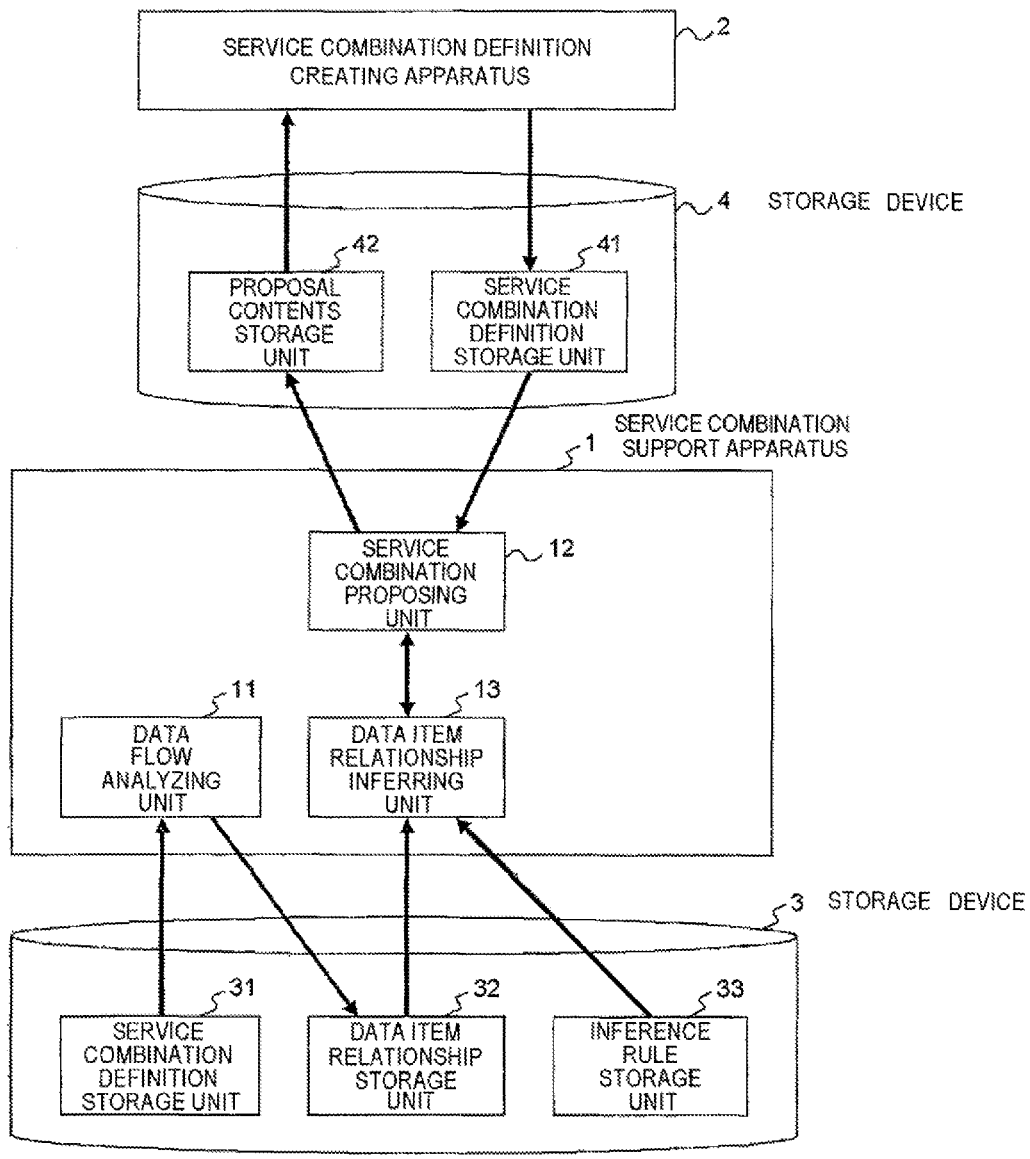
FIG. 1 is a block diagram showing an example structure of a first exemplary embodiment of the present invention.

As shown in FIG. 1, this exemplary embodiment includes a service combination support apparatus 1, a service combination definition creating apparatus 2, and storage devices 3 and 4 such as disk devices.

The service combination definition creating apparatus 2 is a device that is used when a developer creates a service combination definition, and is realized by a personal computer or the like. The storage device 4 connected to the service combination definition creating apparatus 2 includes a service combination definition storage unit 41 and a proposal contents storage unit 42. A definition of a service combination under development is registered in the service combination definition storage unit 41. The Service combination definition will be described later in detail. Candidates of connection destinations proposed by the service combination support apparatus 1 for data items having no connection destinations defined yet are registered in the proposal contents storage unit 42.

The service combination support apparatus 1 is an apparatus that supports development of the service combination definition, and is realized by a computer. The service combination support apparatus 1 includes a data flow analyzing unit 11, a service combination proposing unit 12, and a data item relationship inferring unit 13, and further is connected to the storage devices 3 and 4. The storage device 3 includes a service combination definition storage unit 31, a data item relationship storage unit 32, and an inference rule storage unit 33.

One or more service combination definitions that have already been developed are registered in the service combination definition storage unit 31. The Service combination definition is to specify the flow of data items between services, and specific examples of the service combination definition include a business process definition written in WS-BPEL, and codes written in script languages such as Perl and Ruby or languages specially designed for mashup descriptions.

FIG. 2 shows an example of the contents of the service combination definition storage unit 31. The first and second rows in the example shown in the figure define "serviceA" and "serviceX", which are call targets. The fourth row defines an instruction to call "serviceA", and store a response from "serviceA" into "resA". The sixth row defines an instruction to assign the value in the "namae" attribute in the response from "serviceA" stored in "resA" to the "name" attribute in "reqX". The seventh row defines an instruction to call "serviceX" with "reqX", and store the response into "resX".

The data flow analyzing unit 11 has a function to extract a pair of data items associated with each other by a service combination definition (a pair of connectable data items) by reading the service combination definition from the service combination definition storage unit 31, and analyzing exchanges of data items between services, and also has a function to register the extracted pairs in the data item relationship storage unit 32. More specifically, the data flow analyzing unit 11 analyzes the service combination definition stored in the service combination definition storage unit 31, and extracts, from the service combination definition, a service on the transmission side, a service on the reception side, and the data item names (the data attributes) of the data to be transmitted and received in the respective services for the data flow defined by the service combination definition. The data flow analyzing unit 11 then registers, in the data item relationship storage unit 32, an output data item containing the transmitter information indicating the extracted service on the transmission side and the data attribute in the service on the transmission side, and an input data item containing the recipient information indicating the extracted service on the reception side and the data attribute in the service on the reception side in association with each other. Here, the transmitter information and the recipient information is, for example, the identification information indicating the service names of the services of the transmitter and the recipient, and the services. Input/output identification information indicating whether to input or output may be associated with those data items.

FIG. 3 shows an example of the contents of the data item relationship storage unit 32. The first row in the figure indicates that the data item of the data item name "namae" that is output from the service of the service name "serviceA" can be connected to the data item of the data item name "name" that is input by the service of the service name "serviceX". In the following description, the data item of the data item name "aaa" will be referred to as the data item "aaa" in some cases.

The service combination proposing unit 12 has a function to read a service combination definition under development from the service combination definition storage unit 41 and extract the data item for which a connection destination has not been defined, a function to inquire of the data item relationship inferring unit 13 about the data item connectable to the extracted data item, and a function to edit a response (including the data item specific information of the connectable data item) to the inquiry as needed and store the response into the proposal contents storage unit 42.

The data item relationship inferring unit 13 has a function to retrieve a data item connectable to a specific data item about which the service combination proposing unit 12 has inquired from the data item relationship storage unit 32, a function to infer a data item connectable to the specific data item with the use of the contents (the existing pairs) of the data item relationship storage unit 32 and inference rules registered in the inference rule storage unit 33, and a function to return the data item specific information about the retrieved and inferred data items to the service combination proposing unit 12.

More specifically, when the output data item contained in the first pair and the input data item contained in the second pair correspond to each other among a plurality of existing pairs registered in the data item relationship storage unit 32, the data item relationship inferring unit 13 generates a new pair that is formed with the output data item contained in the first pair and the input data item contained in the second pair and differs from the existing pairs. The output data item contained in the first pair and the input data item contained in the second pair that are regarded as corresponding to each other here may not be completely the same as each other, and at least one of the above described transmitter information, the recipient information, the data attribute, and the input/output information should be the same between the output data item contained in the first pair and the input data item contained in the second pair.

The data item relationship inferring unit 13 retrieves a specific pair containing a designated specific data item (an output data item or an input data item) from the plurality of existing pairs registered in the data item relationship storage unit 32, and generates a new pair from the retrieved specific pair.

The service combination support apparatus 1 is realized by a computer, for example, in the following manner. A recording medium such as a disk or a semiconductor memory that records the program for causing a computer to function as the service combination support apparatus 1 is prepared, and the program is read by the computer. The computer controls its operations according to the read program, to realize the data flow analyzing unit 11, the service combination proposing unit 12, and the data item relationship inferring unit 13 in the computer.

[Explanation of Operations of the First Exemplary Embodiment]

Next, operations of this exemplary embodiment are described in detail.

[Operation of the Data Flow Analyzing Unit 11]

Figure 4:
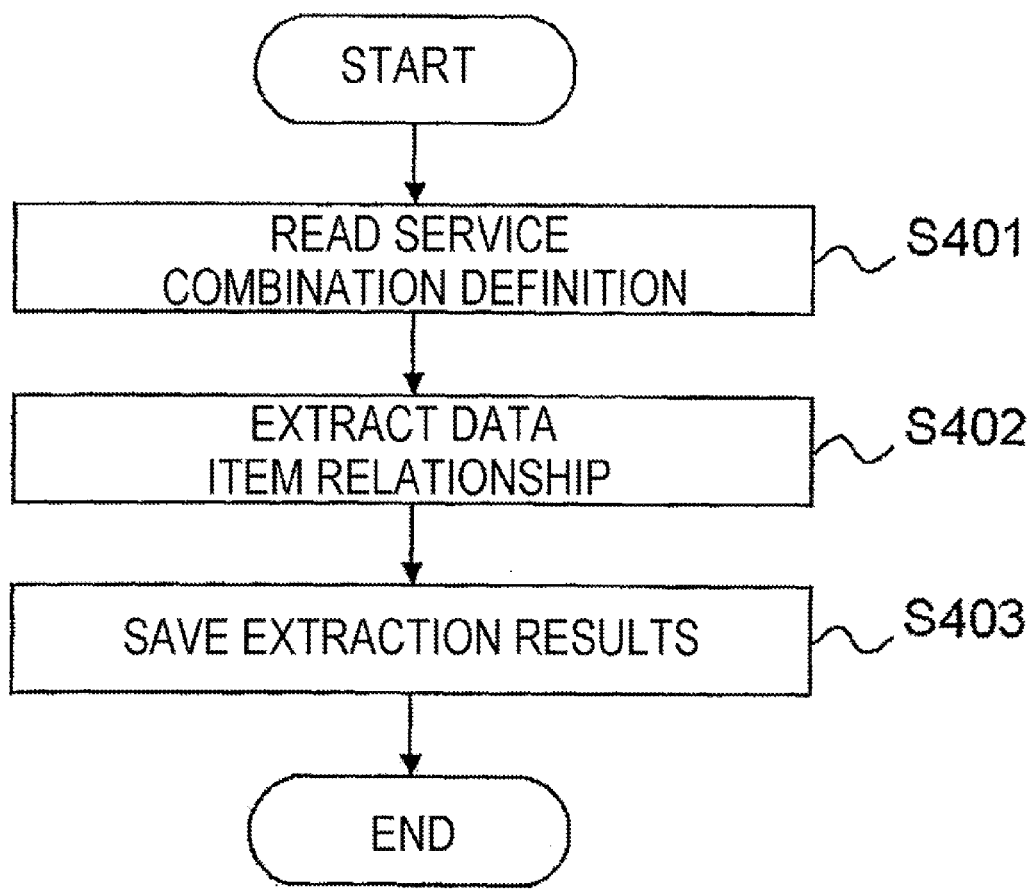
FIG. 4 is a flowchart showing an example of the operation of the data flow analyzing unit.

Referring first to the flowchart shown in FIG. 4, the operation of the data flow analyzing unit 11 is described. When activated, the data flow analyzing unit 11 reads the service combination definition from the service combination definition storage unit 31 (step S401), and extracts a pair of data items associated with each other by this definition (step S402). After that, the data flow analyzing unit 11 associates the respective data item specific information about the two data items forming the extracted pair with each other, and stores the data item specific information into the data item relationship storage unit 32 (step S403). As described above, data item specific information includes a data item name, the service name of the service having the data item, and identification information indicating whether to input or output.

At this point, if the contents of the service combination definition storage unit 31 are the same as the contents shown in FIG. 2, for example, the data flow analyzing unit 11 performs the following operation at steps S402 and S403.

At step S402, the data flow analyzing unit 11 first analyzes the assignment statement of the fourth row to determine that a response from "serviceA" is stored in "resA". The data flow analyzing unit 11 then analyzes the sixth row to determine that the value in the data attribute "namae" of "resA" has been transferred to the data attribute "name" of "reqX". Further, the data flow analyzing unit 11 analyzes the seventh row to determine that "reqX" is a request to "serviceX", and "resX" is a response from "serviceX". At last, based on the above analysis results, the data flow analyzing unit 11 recognizes that the data item name "namae" that is output from "serviceA" is associated with the data item name "name" that is an input of "serviceX".

At step S403, the respective data item specific information ("serviceA/output/namae" and "serviceX/input/name") of the two data items are associated with each other, and are stored into the data item relationship storage unit 32 (see the first row of FIG. 3).

[Operations of the Service Combining Proposing Unit 12 and the Data Item Relationship Inferring Unit 13]

Figure 5:
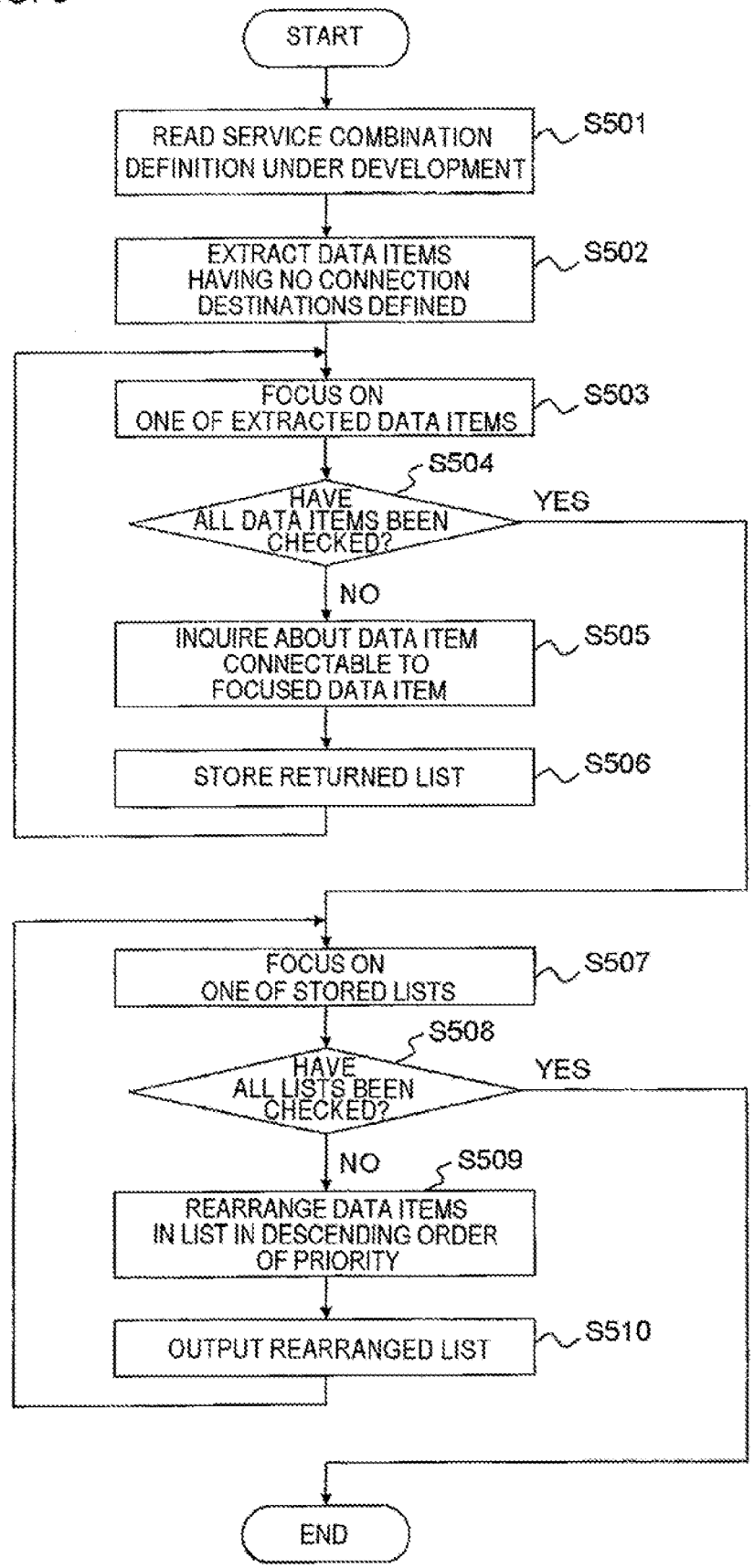
FIG. 5 is a flowchart showing an example of the operation of the service combination proposing unit.
Figure 6:
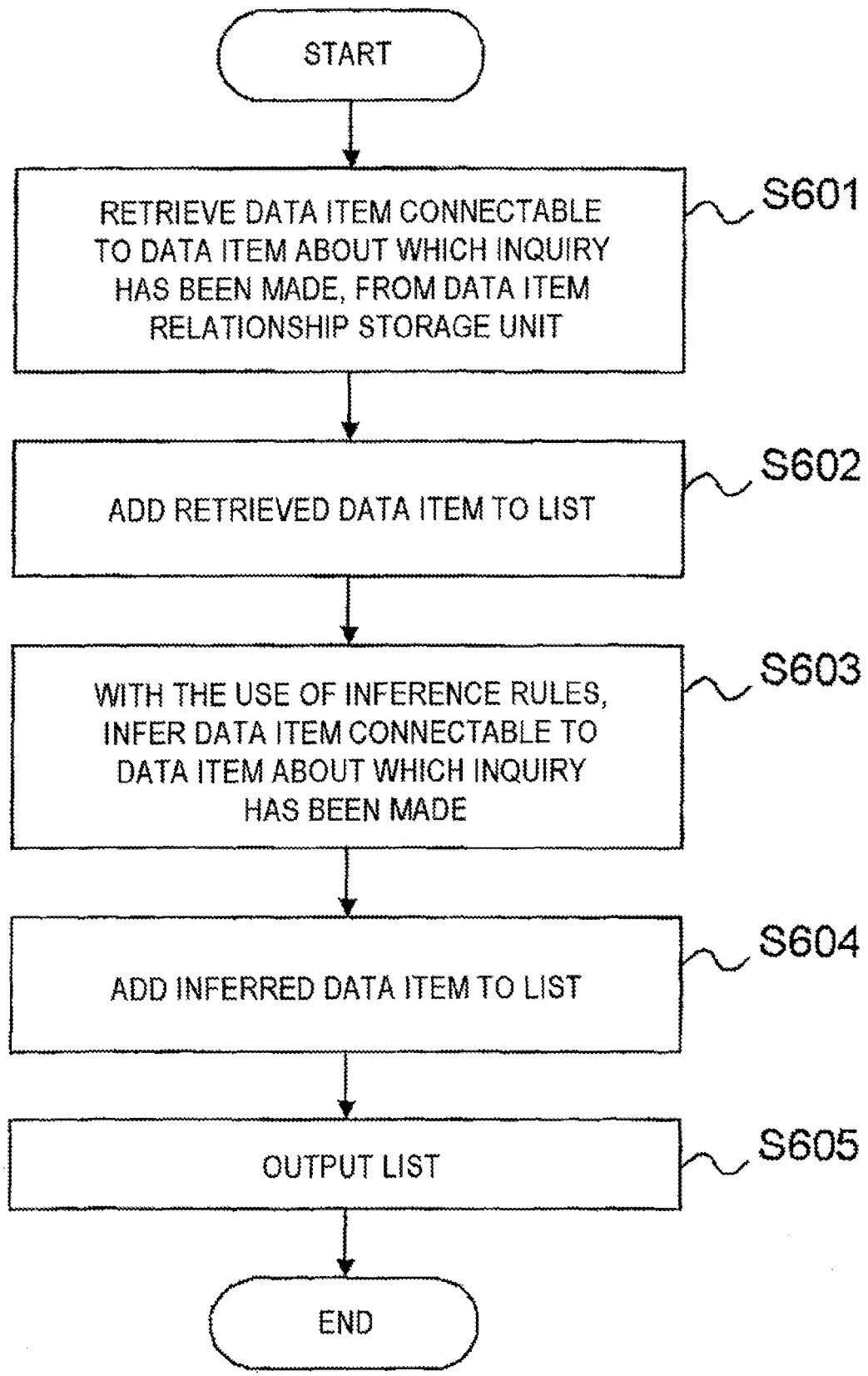
FIG. 6 is a flowchart showing an example of the operation of the data item relationship inferring unit.

Referring now to the flowcharts of FIGS. 5 and 6, operations of the service combination proposing unit 12 and the data item relationship inferring unit 13 are described.

To look up a data item connectable to a certain data item while developing a service combination definition, a developer who is creating the service combination definition with the use of the service combination definition creating apparatus 2 activates the service combination proposing unit 12 in the service combination support apparatus 1. At this point, the service combination definition under development is already stored in the service combination definition storage unit 41.

After activated, the service combination proposing unit 12 reads the service combination definition under development from the service combination definition storage unit 41, and extracts a data item having no connection destinations defined (steps S501 and S502 of FIG. 5).

At this point, the service combination definition read from the service combination definition storage unit 41 is the same as the service combination definition shown in FIG. 7, for example. The service combination definition shown in the figure has the right-hand side of the second row left open. In other words, the developer has just activated the service combination proposing unit 12, to lookup a data item connectable to "reqY.hatsumeisha" set on the left-hand side of the second row. In the following description, the service combination definition under development is considered to be the same as the service combination definitions shown in FIG. 7.

Reading the service combination definition shown in FIG. 7, the service combination proposing unit 12 finds out from the second row that the connection destination of "recY.hatsumeisha" has not been defined, and finds out from the third row that "regY" is an input of "serviceY". Accordingly, the service combination proposing unit 12 extracts the data item "serviceY/input/hatsumeisha" having no connection destinations defined.

After that, with one of the data items extracted at step S502 being focused on, the service combination proposing unit 12 inquires of the data item relationship inferring unit 13 about a data item connectable to the focused data item (steps S503 and S505). More specifically, an inquiry statement containing the data item specific information specifying the focused data item is output to the data item relationship inferring unit 13. After that, the service combination proposing unit 12 is in a waiting state of a response from the data item relationship inferring unit 13.

Having received the inquiry statement from the service combination proposing unit 12, the data item relationship inferring unit 13 retrieves a data item connectable to the data item about which the inquiry has been made from the data item relationship storage unit 32, and adds the retrieved data item to the list (steps S601 and S602 in FIG. 6). More specifically, the data item relationship inferring unit 13 retrieves the data item specific information paired with the data item specific information contained in the inquiry statement from the data item relationship storage unit 32, and adds the retrieved data item specific information to the list. When adding the retrieved data item specific information to the list, the data item relationship inferring unit 13 adds, to the retrieved data item specific information, information indicating that the data item specific information is retrieved information. This is why the retrieved data item specific information is distinguished from the later described inferred data item specific information.

At this point, if the contents of the data item relationship storage unit 32 are the same as the contents shown in FIG. 3, and the inquiry statement contains the data item specific information "serviceY/input/hatsumeisha", for example, the data item specific information "serviceB/output/shimei" is retrieved at step S601.

After that, the data item relationship inferring unit 13 uses the data item relationship storage unit 32 and the inference rules stored in the inference rule storage unit 33, to infer a data item connectable to the data item about which the inquiry has been made, and adds the inferred data item to the list (steps S603 and S604). More specifically, with the data item contained in the inquiry statement being the start point, the data item relationship inferring unit 13 infers a connectable data item by searching the data item relationships registered in the data item relationship storage unit 32 according to the inference rules, and adds the inferred data item to the list. When adding the inferred data item to the list, the data item relationship inferring unit 13 adds, to the inferred data item, information indicating that the data item is an inferred data item.

At this point, the following two inference rules 1 and 2 are already registered in the inference rule storage unit 33, for example.

Inference rule 1: the output data item associated with the same input data item by the service combination definition is regarded as being of the same data type.

Inference rule 2: the input data item associated with the same output data item by the service combination definition is regarded as being of the same data type.

An input data item and an output data item that are regarded as being of the same data type according to the inference rules 1 and 2 are determined to be connectable to each other (corresponding to each other).

The inference rule 1 and the inference rule 2 registered in the inference rule storage unit 33 are realized by the service combination support apparatus 1 executing a program that reflects the above points.

Based on the two inference rules 1 and 2 stored in the inference rule storage unit 33, the data item relationship inferring unit 13 operates as follows. In a case where the data item relationship inferring unit 13 determines that the output data item contained in the third pair and the output data item contained in the first pair among the existing pairs correspond to each other based on the inference rule 1, and determines that the input data item contained in the third pair and the input data item contained in the second pair correspond to each other based on the inference rule 2, the data item relationship inferring unit 13 determines that the output data item contained in the first pair and the input data item contained in the second pair correspond to each other.

More specifically, if the inquiry statement transferred from the service combination proposing unit contains the data item specific information "serviceY/input/hatsumeisha" in a case where the contents of the data item relationship storage unit 32 are the same as the contents shown in FIG. 3, the following procedures are carried out at steps S603 and S604.

First, a check is made to determine whether "output" or "input" is indicated by the identification information in the data item specific information contained in the inquiry statement. If the identification information indicates "output", the inference rule 1 and the inference rule 2 are used in this order, to infer a connectable data item. If the identification information indicates "input", the inference rules are used in reverse order (the inference rule 2, the inference rule 1), to infer a connectable data item.

In this example, the inquiry statement contains the data item specific information "serviceY/input/hatsumeisha", and the identification information indicates "input". Therefore, the inference rule 2 is first used, and the data item specific information "serviceY/input/hatsumeisha" about which an inquiry has been made and the data item specific information "serviceX/input/name" are regarded as being of the same data type. In other words, receiving data from the same data item specific information "serviceB/output/shimei", the data item specific information "serviceY/input/hatsumeisha" and the data item specific information "serviceX/input/name" are regarded as being of the same data type.

Next, the inference rule 1 is used, and the data item specific information "serviceB/output/shimei" and the data item specific information "serviceA/output/namae" are regarded as being of the same data type. In other words, since data is supplied to the same data item specific information "serviceX/input/name", the data item specific information "serviceB/output/shimei" and the data item specific information "serviceA/output/namae" are regarded as being of the same data type.

As a result of this, the data item relationship inferring unit 13 infers that the data item specific information "serviceY/input/hatsumeisha" about which an inquiry has been made and the data item specific information "serviceA/output/namae" are the same data type, and the data item specific information "serviceY/input/hatsumeisha" and the data item specific information "serviceA/output/namae" can be connected to each other. The inferred pair is a pair that is not registered in the data item relationship storage unit 32. After that, the data item relationship inferring unit 13 adds the inferred data item specific information "serviceA/output/namae" to the list. The above described procedures are specific examples of procedures to be carried out at steps S603 and S604.

After that, the data item relationship inferring unit outputs the list, in which the data item specific information ("serviceB/output/namae") retrieved at step S601 and the data item specific information ("serviceA/output/namae") inferred at step S603 are set, to the service combination proposing unit 12 (step S605).

Referring back to FIG. 5, when the above described list is sent from the data item relationship inferring unit 13, the service combination proposing unit 12 stores the list associated with the data item specific information "serviceY/input/hatsumeisha" of the data item about which the inquiry has been made, into a memory (not shown) (step S506).

After that, the service combination proposing unit 12 returns to step S503, and focuses on the next data item. In the case of this example, there is not an unprocessed data item (YES at step S504), and therefore, the service combination proposing unit 12 focuses on one of the list stored in the memory (step S507).

After that, the service combination proposing unit 12 rearranges the data item specific information in the list in descending order of priority (step S509), and registers, in the proposal contents storage unit 42, the rearranged list and the data item specific information "serivceY/input/hatsumeisha" associated with this list in the memory (step S510). In other words, the service combination proposing unit 12 rearranges the data item specific information in the list in descending order of the possibility that the developer has the data item specific information connected to the data item specific information "serviceY/input/hatsumeisha" about which the inquiry has been made. In the case of this example (in the example shown in FIG. 7), calling "serviceA" and storing the response into "resA" are written in the first row that is immediately before the second row in which the data item specific information "serviceY/input/hatsumeisha" about which the inquiry has been made exist. Accordingly, the data item specific information ("serviceB/output/shimei" and "serivceA/output/namae") in the list is rearranged so that the data item to be output from "serviceA" is put first, followed by the data item to be output from the other "service".

After that, the service combination proposing unit 12 returns to the procedure of step S507, and focuses on the next list. In the case of this example, there is not an unprocessed list, and therefore, this operation comes to an end (YES at step S508).

Meanwhile, the service combination definition creating apparatus 2 reads the list and the data item specific information of the data item about which the inquiry has been made, from the proposal contents storage unit 42. According to the list and the data item specific information, the service combination definition creating apparatus 2 displays a proposal screen shown in FIG. 8 on a display unit (not shown). The data item specific information about data items connectable to the data item about which the inquiry has been made is displayed on this proposal screen in descending order of priority. Further, information that indicates whether the subject data item specific information has been retrieved or inferred is displayed in each piece of data item specific information. The example in FIG. 8 shows that "serviceA/output/namae" and "serviceB/output/shimei" has been "inferred" and "retrieved", respectively.

[Advantages of the First Exemplary Embodiment]

According to this exemplary embodiment, the data item connectable to a designated specific data item can be retrieved not only from the existing pairs of output data items and input data items that have already been determined to be connectable, but also from pairs of output data items and input data items that have not been determined to be connectable but can be inferred from the existing pairs. This is because this exemplary embodiment includes the data item relationship inferring unit 13 that checks the sameness in data type between the output data item and the input data item in different pairs of the plural existing pairs of output data items and input data items of the same data types associated with each other by a service combination definition, and infers a new pair of an output data item and an input data item of the same data type, with the combination of the output data item and the input data item being different from those in the existing pairs.

[Second Exemplary Embodiment of the Invention]

Next, a second exemplary embodiment of the present invention is described. This exemplary embodiment includes inferring a service connectable to a service that appears in the service combination definition under development, and presenting the inferred service to the developer.

[Explanation of the Structure of the Second Exemplary Embodiment]

Figure 9:
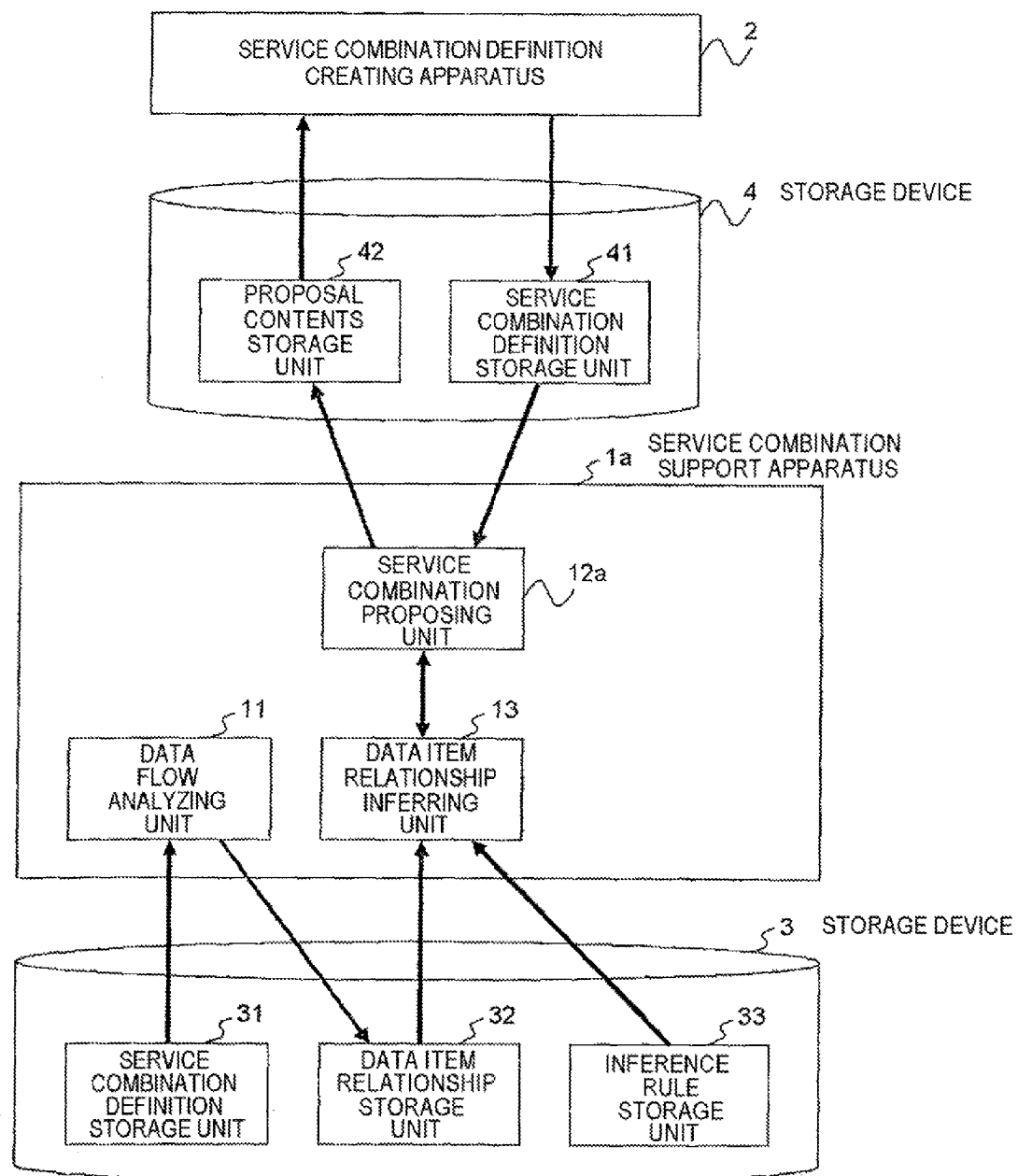
FIG. 9 is a block diagram showing an example structure of a second exemplary embodiment of the present invention.

Referring to FIG. 9, the second exemplary embodiment of the present invention differs from the first exemplary embodiment shown in FIG. 1 in including a service combination support apparatus 1a, instead of the service combination support apparatus 1.

The service combination support apparatus 1a differs from the service combination support apparatus 1 of the first exemplary embodiment in including a service combination proposing unit 12a, instead of the service combination proposing unit 12.

The service combination proposing unit 12a has a function to read the service combination definition under development from the service combination definition storage unit 41 and extract all the data items written in the service combination definition, a function to inquire of the data item relationship inferring unit 13 about a service connectable to the extracted data items, and a function to generate a service name list in which the service combination definition under development and the connectable service are set based on the list sent from the data item relationship inferring unit 13 in response to the inquiry, and register the list in the proposal contents storage unit 42.

The service combination support apparatus 1a of this exemplary embodiment can also be realized by a computer, like the service combination support apparatus 1 of the first exemplary embodiment.

[Explanation of Operations of the Second Exemplary Embodiment]

Next, operations of this exemplary embodiment are described. In the following, only the differences in operations from the first exemplary embodiment are described.

Figure 10:
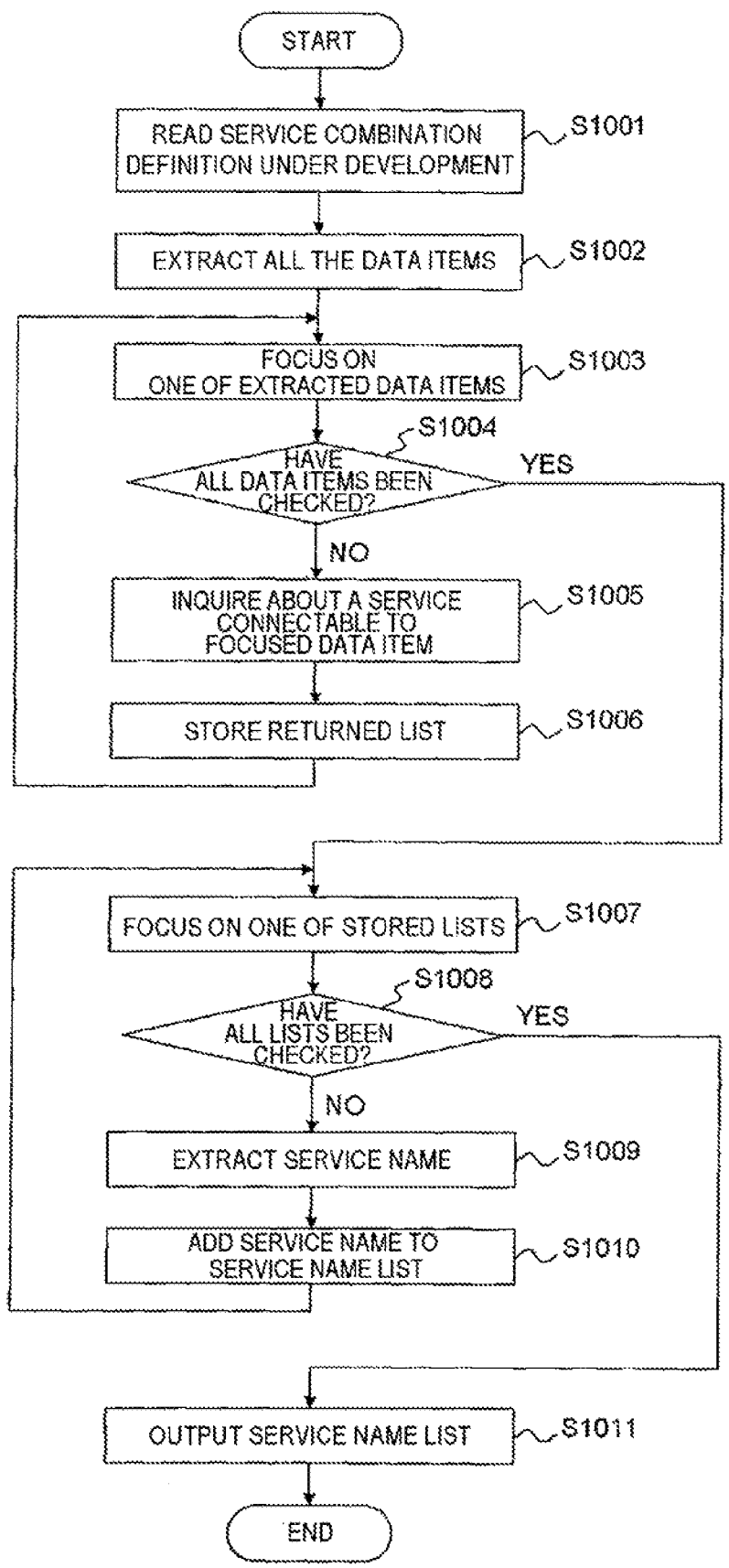
FIG. 10 is a flowchart showing an example of the operation of the service combination proposing unit.

As shown in the flowchart of FIG. 10, after activated, the service combination proposing unit 12a reads a service combination definition under development from the service combination definition storage unit 41, and extracts all the data items written in the service combination definition (steps s1001 and S1002). At this point, if the service combination definition under development stored in the service combination definition storage unit 41 is the same as the service combination definition shown in FIG. 11, for example, four data items that are specified by the data item specific information "serviceA/output/namae",
"serviceX/input/name", "serviceA/output/jyusho",
"serviceX/input/address" are extracted.

After that, the service combination proposing unit 12a focuses on one of the extracted data items, outputs an inquiry statement containing the data item specific information about the data item to the data item relationship inferring unit 13, and waits for a response from the data item relationship inferring unit 13 (steps S1003 and S1005).

After the inquiry statement is sent from the service combination proposing unit 12a, the data item relationship inferring unit 13 carries out the same procedures as those described in the first exemplary embodiment (steps S601 through S605 in FIG. 6), and returns a list containing the data item specific information about a data item connectable to the data item about which the inquiry has been made, to the service combination proposing unit 12a.

After the list is returned from the data item relationship inferring unit 13, the service combination proposing unit 12a stores the list into a memory (not shown) (step S1006). After that, the service combination proposing unit 12a focuses on the next data item, and carries out the same procedures as those described above. If there is no longer an unprocessed data item (YES at step S1004), the service combination proposing unit 12a focuses on one of the lists stored in the memory, extracts the service name set in the list, and adds the service name to the service name list (steps S1007, S1009, and S1010). As for the service names already registered in the service name list, the adding process is not performed.

After that, the service combination proposing unit 12a focuses on the next list (step S1007), and carries out the same procedures as those described above. If there is no longer an unprocessed list, the service combination proposing unit 12a registers the service name list in the proposal contents storage unit 42 (YES at step S1008, and S1011).

The service combination definition creating apparatus 2 reads the service name list registered in the proposal contents storage unit 42, and displays, on a display unit (not shown), the service names set in the service name list as the services connectable to the service combination definition under development.

[Advantages of the Second Exemplary Embodiment]

According to this exemplary embodiment, a service connectable to a service that appears in a service combination definition under development can be retrieved not only from an existing pair of an output data item and an input data item that has already been determined to be connectable, but also from a pair of an output data item and an input data item that has not been determined to be connectable but can be inferred from the existing pair. This is because this exemplary embodiment includes the service combination proposing unit 12a that inquires of the data item relationship inferring unit 13 about'all the data items defined in the service combination definition under development, and presents the service name in relation to a new pair inferred by the service combination proposing unit 12a in response to the inquiry.

[Third Exemplary Embodiment of the Invention]

Next, a third exemplary embodiment of the present invention is described. This exemplary embodiment is characterized by inferring and storing a connectable data item in advance so as to shorten the response time when an inquiry is made about a data item connectable to a specific data item.

[Explanation of the Structure of the Third Exemplary Embodiment]

Figure 12:
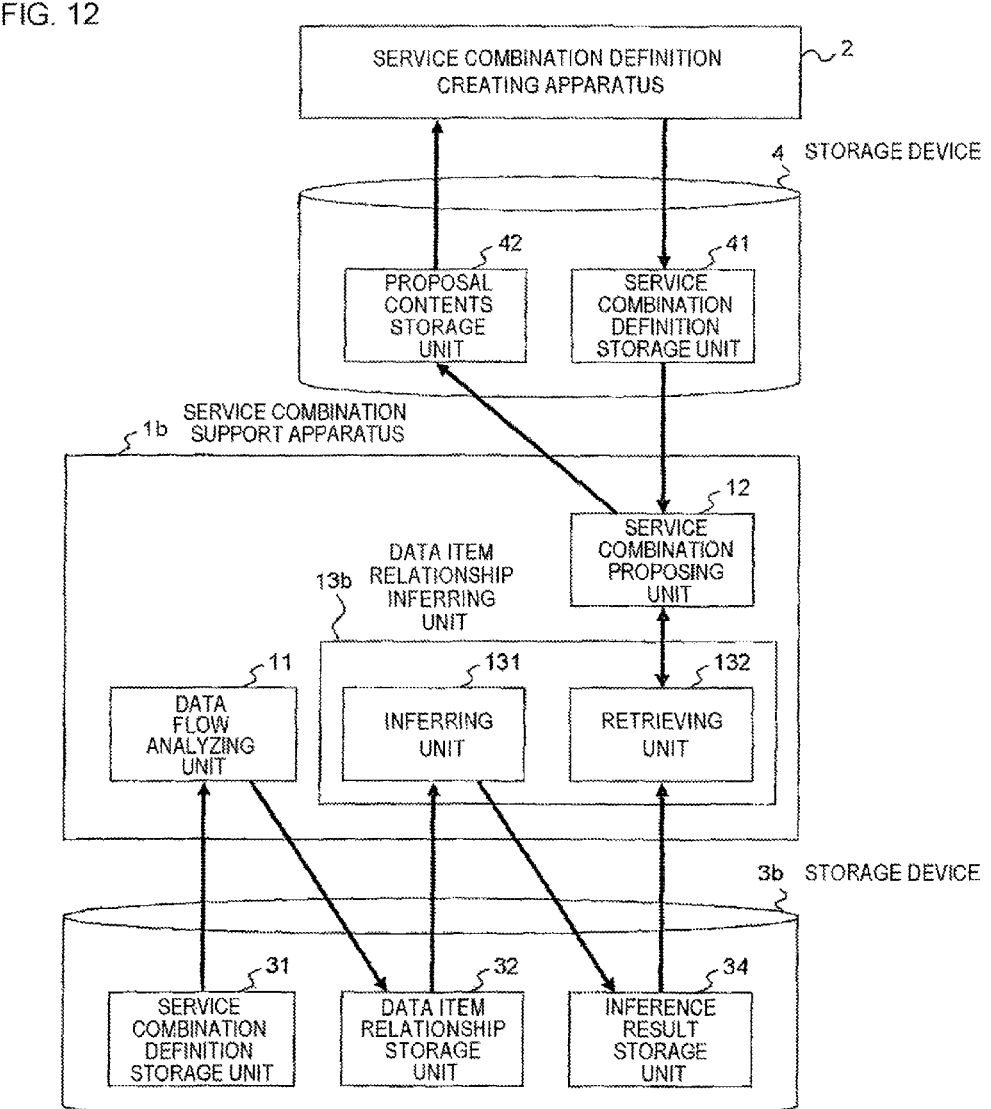
FIG. 12 is a block diagram showing an example structure of a third exemplary embodiment of the present invention.
Figure 15:
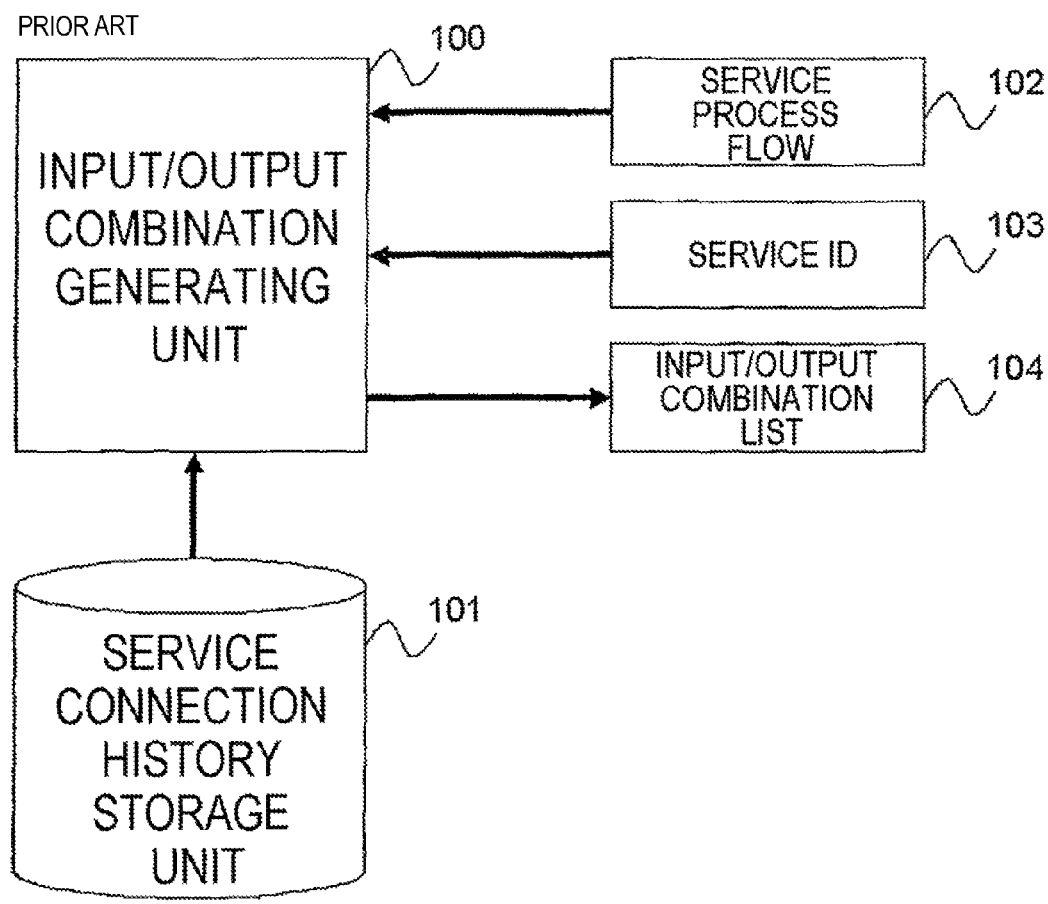
FIG. 15 is a block diagram for explaining a related art.
Figure 16:
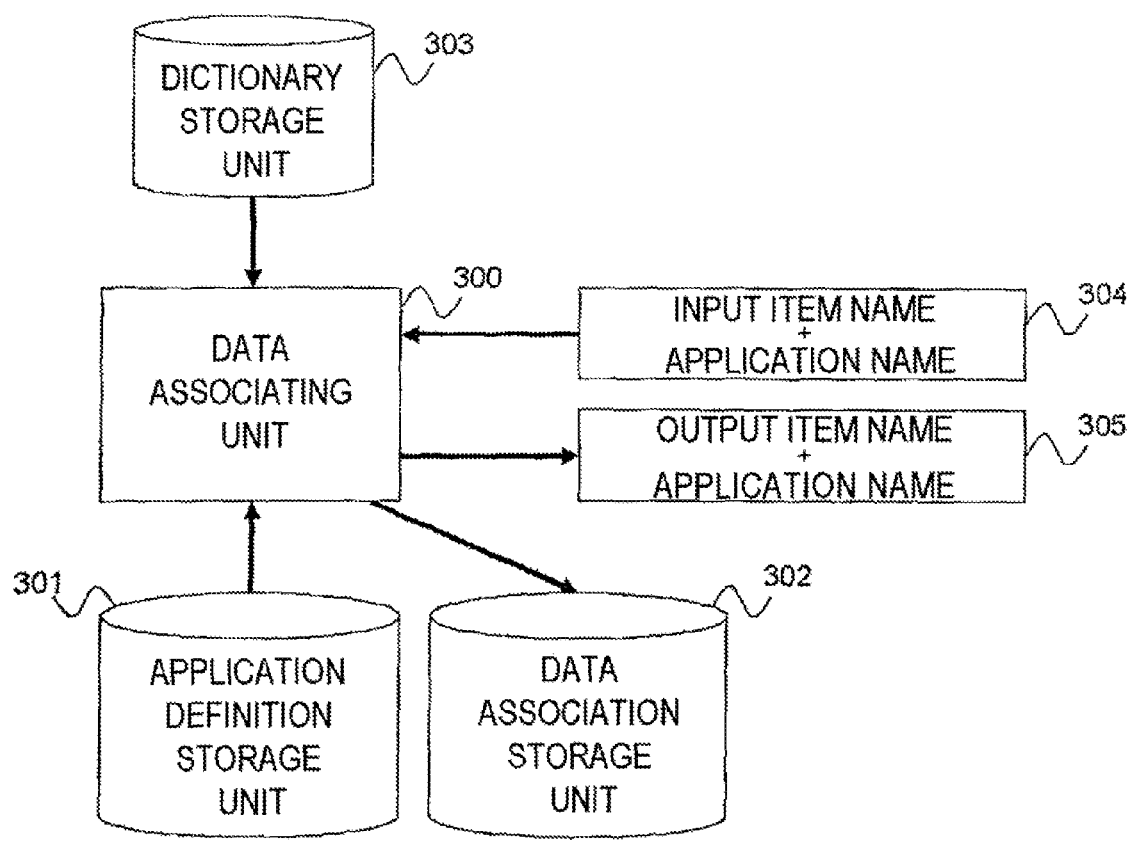
FIG. 16 is a diagram for explaining another related art.

As shown in FIG. 12, this exemplary embodiment differs from the first exemplary embodiment in including a service combination support apparatus 1b and a storage device 3b, instead of the service combination support apparatus 1 and the storage device 3, respectively.

The service combination support apparatus 1b differs from the service combination support apparatus 1 in including a data item relationship inferring unit 13b, instead of the data item relationship inferring unit 13. The storage device 3b differs from the storage device 3 in including an inference result storage unit 34, instead of the inference rule storage unit 33.

The data item relationship inferring unit 13b includes an inferring unit 131 and a retrieving unit 132.

The inferring unit 131 has a function to sequentially read the existing pair of the output data item and the input data item stored in the data item relationship storage unit 32, allot the same data type number to the data item of the same data type (an output data item and an input data item of the same data type can be connected), and store the data item into the inference result storage unit 34. More specifically, the inferring unit 131 assigns the same data type number to an output data item and an input data item associated with each other by the service combination definition, or input data items corresponding to each other according to the inference rule 1, or output data items corresponding to each other according to the inference rule 2 among the output data items and the input data items forming the existing pairs stored in the data item relationship storage unit 32. The inferring unit 131 then stores the output data items or the input data items having the data type number assigned thereto into the inference result storage unit 34.

In a case where the service combination proposing unit 12 inquires about a data item connectable to a specific data item, the retrieving unit 132 has a function to search the data items of the same data type number as the specific data item among the data items stored in the inference result storage unit 34, and return a list including the search result to the service combination proposing unit 12. More specifically, the retrieving unit 132 generates a new pair that is formed with an output data item having a designated specific data type number assigned thereto and an input data item having the specific data type number assigned thereto among the output data items and input data items stored in the inference result storage unit 34. The retrieving unit 132 then returns the new pair to the service combination proposing unit 12.

The service combination support apparatus 1b of this exemplary embodiment can also be realized by a computer, like the service combination support apparatus 1 of the first exemplary embodiment.

[Explanation of Operations of the Third Exemplary Embodiment]

Next, operations of this exemplary embodiment are described. In the following, only the differences from the first exemplary embodiments are described.

[Operation of the Inferring Unit 131]

The inferring unit 131 is activated when there is a change in the contents of the data item relationship storage unit 32 or the like, and carries out the procedures shown in the flowchart of FIG. 13.

The inferring unit 131 first reads one of the pairs of output data items and input data items stored in the data item relationship storage unit 32 (step S1301).

In a case where either of the data items forming the read pair is not registered in the inference result storage unit 34, the inferring unit 131 generates a new data type number, associates each of the data items with the data type number, and registers the data items in the inference result storage unit 34 (YES at step S1303, and S1304). After that, the inferring unit 131 reads the next pair (step S1301).

In a case where only one of the data items is registered, the inferring unit 131 associates the other data item with the same data type number as the one of the data items, and registers the data items (YES at step S1305, and S1306). After that, the inferring unit 131 reads the next pair (step S1301).

In a case where the two data items are registered but are associated with different data type numbers from each other, one of the data type numbers is selected, and the other data type number is replaced with the one of the data type numbers (NO at step S1307, and S1308). After that, the inferring unit 131 reads the next pair (step S1301).

In a case where the two data items are both registered and are associated with the same data type number (YES at step S1307), the inferring unit 131 immediately reads the next pair (step S1301).

The inferring unit 131 repeats above procedures until there is no longer an unprocessed pair (YES at step S1302), and then ends this operation.

At this point, if the contents of the data item relationship storage unit 32 are the same as the contents shown in FIG. 3, for example, the following procedures are carried out in the inferring unit 131.

In a case where the pair in the first row ("serviceA/output/namae" and "serviceX/input/name") is read, both of the data items are not registered in the inference result storage unit 34, and therefore, "serviceA/output/namae" and "serviceX/input/name" are associated with the data type number "1", and are then registered (YES at step S1303, and S1304), as shown in FIG. 14(A).

In a case where the pair in the second row ("serviceB/output/shimei" and "serviceX/input/name") is read, only one data item "serviceX/input/name" of the two is registered in the inference result storage unit 34, and therefore, the other data item "serviceB/output/shimei" is associated with the data type number "1", and is then registered in the inference result storage unit 34 (YES at step S1305, and S1306), as shown in FIG. 14(B).

In a case where the pair in the third row ("serviceB/output/shimei" and "serviceY/input/hatumeisha") is read, only one data item "serviceB/output/shimei" of the two is registered in the inference result storage unit 34, and therefore, the other data item "serviceY/input/hatsumeisha" is associated with the data type number "1", and is then registered in the inference result storage unit 34 (steps S1305 and S1306), as shown in FIG. 14(C).

[Operation of the Retrieving Unit 132]

When an inquiry statement containing data item specific information is transferred from the service combination proposing unit 12, the retrieving unit 132 first searches the inference result storage unit 34 for the data type number (α) associated with the data item specific information. After that, the retrieving unit 132 retrieves data item specific information that has the same data type number as the retrieved data type number (α) and holds identification information in a reverse direction, and adds the retrieved data item specific information to a list. After completing the search of the inference result storage unit 34, the retrieving unit 132 returns the list to the service combination proposing unit 12.

Although the data item relationship storage unit 32 and the inference result storage unit 34 are different storage units in this exemplary embodiment, those two units may be formed as one storage unit. Also, in this exemplary embodiment, the inferring unit 131 sequentially reads the pairs stored in the data item relationship storage unit 32, and assigns the same data type numbers to data items of the same data types before storing the data items into the inference result storage unit 34. However, the inferring unit 131 may sequentially extract a pair of an output data item and an input data item associated with each other by the service combination definition registered in the service combination definition storage unit 31, allot the same data type numbers to data items of the same data types, and store the data items into the inference result storage unit 34.

[Advantages of the Third Exemplary Embodiment]

According to this exemplary embodiment, the response time can be shortened where an inquiry is made about a data item connectable to a specific data item. This is because this exemplary embodiment includes the inferring unit 131 that registers the information about a pair of connectable data items in the inference result storage unit 34, with the pair being inferred from the existing pairs stored in the data item relationship storage unit 32.

Although the exemplary embodiments of the present invention have been described so far with reference to the drawings, they are merely examples of the invention, and the following exemplary embodiments may also be formed.

1) A service combination support apparatus that includes a data item relationship inferring unit that checks the sameness in data type between an output data item contained in one pair and an input data item contained in a different pair from the one pair among existing pairs each formed with an output data item and an input data item of the same data type associated with each other by a service combination definition, and infers a new pair that is formed with an output data item and an input data item of the same data type, the new pair in which a combination of the output data item and the input data item is different from those in the existing pairs.

2) In the service combination support apparatus of 1), when a specific data item is designated and an inference is requested about a data item to be paired with the specific data item, the data item relationship inferring unit infers a new pair that is formed with an output data item and an input data item of the same data type as the specific data item, the new pair in which a combination of the output data item and the input data item is different from those in the existing pairs.

3) In the service combination support apparatus of 2), the data item relationship inferring unit checks the sameness in data type between an output data item and an input data item in different pairs from each other, using inference rules specifying that output data items supplying data to the same input data item are regarded as being of the same data type, and input data items receiving data from the same output data item are regarded as being of the same data type.

4) In the service combination support apparatus of 3)
a data item relationship storage unit is provided, and
the data item relationship inferring unit stores the information about the inferred new pair into the data item relationship storage unit, and retrieves a data item to be paired with a specific data item from the data item relationship storage unit when the specific data item is designated and an inference is requested about the data item to be paired with the specific data item.

5) In the service combination support apparatus of 4),
the data item relationship inferring unit associates an output data item and an input data item with a new data type number and registers the output data item and the input data item, when both of the output data item and the input data item forming a pair are not registered in the data item relationship storage unit,
the data item relationship inferring unit associates another one of the data items with the same data type number as one of the data items and registers the data items, when only one of the data items is registered, and
the data item relationship inferring unit replaces one of different data type numbers with another one of the different data type numbers, when both of the data items are registered but are associated with the different data type numbers, the data item relationship inferring unit carrying out the above process for each of the existing pairs.

6) In the service combination support apparatus of 5), when a specific data item is designated and an inference is requested about a data item to be paired with the specific data item, the data item relationship inferring unit sets, to a search target,
a data item of the same data type number as the data type number of the specific data item among the data items registered in the data item relationship storage unit.

7) The service combination support apparatus of 2), which includes
a service combination proposing unit that extracts a data item of which a connection destination is not defined from the service combination definition under development, and makes a request to the data item relationship inferring unit, with the extracted data item being regarded as the specific data item.

8) The service combination support apparatus of 2), which includes
a service combination proposing unit that extracts all the data items defined by the service combination definition under development, makes a request to the data item relationship inferring unit, with the extracted data items being regarded as the specific data item, and presents the service name of the service of the data items contained in a new pair inferred by the data item relationship inferring unit in response to the request.

9) A service combination support method that includes a data item relationship inferring step in which a computer checks the sameness in data type between an output data item contained in one pair and an input data item contained in a different pair from the one pair among the existing pairs each formed with an output data item and an input data item of the same data type associated with each other by the service combination definition, with this check being performed with respect to the existing pairs, and infers a new pair that is formed with an output data item and an input data item of the same data type, the new pair in which a combination of the output data item and the input data item is different from those in the existing pairs.

10) In the service combination support method of 9), when a specific data item is designated and an inference is requested about a data item to be paired with the specific data item,
a new pair that is formed with an output data item and an input data item of the same data type as the specific data item is inferred in the data item relationship inferring step, the new pair in which the combination of the output data item and the input data item is different from those in the existing pairs.

11) In the service combination support method of 9) or 10), the sameness in data type between an output data item and an input data item in different pairs from each other is checked in the data item relationship inferring step, using inference rules specifying that output data items supplying data to the same input data item are regarded as being of the same data type, and input data items receiving data from the same output data item are regarded as being of the same data type.

12) A program for causing a computer to function as a service combination support apparatus,
the computer is caused to function as a data item relationship inferring unit that checks the sameness in data type between an output data item contained in one pair and an input data item contained in a different pair from the one pair among the existing pairs each formed with an output data item and an input data item of the same data type associated with each other by a service combination definition, with this check being performed with respect to the existing pairs, and infers a new pair that is formed with an output data item and an input data item of the same data type, the new pair in which a combination of the output data item and the input data item is different from those in the existing pairs.

13) In the program of 12), when a specific data item is designated and an inference is requested about a data item to be paired with the specific data item, the data item relationship inferring unit infers a new pair that is formed with an output data item and an input data item of the same data type as the specific data item, the new pair in which the combination of the output data item and the input data item is different from those in the existing pairs.

14) In the program of 12) or 13), the data item relationship inferring unit checks the sameness in data type between an output data item and an input data item in different pairs from each other, using inference rules specifying that output data items supplying data to the same input data item are regarded as being of the same data type, and input data items receiving data from the same output data item are regarded as being of the same data type.

While the invention has been particularly shown and described with reference to exemplary embodiments thereof, the invention is not limited to these exemplary embodiments.

It will be understood by those of ordinary skill in the art that various modifications in form and details may be made therein without departing from the spirit and scope of the present invention as defined by the claims.

It is of course possible to combine the above described exemplary embodiments and modifications within a range in which the contents of them contradict each other. Although the functions of the respective components and the like have been described in detail in the above exemplary embodiments and modifications, modifications may be made to those functions and the like within the scope of the present invention.

For example, in each of FIGS. 1, 9, and 12, the service combination support apparatus 1 (1a, 1b) and the storage device 3 (3b) are shown as separate apparatuses from each other. However, the storage device 3 may be contained in the service combination support apparatus 1.

Also, in the service combination support method of the present invention, the steps are described in order, but the described order does not limit the order in which the steps are carried out. Therefore, when the service combination support method of the present invention is implemented, the order of the steps can be changed within such a range as not to disturb the contents of the steps.

The present invention may be applied to support in development of the service combination. On the Semantic Web, the present invention may also be applied to structuring of data items.

What is claimed is:

1. A service combination support apparatus comprising a data item relationship inferring unit implemented by a computer including hardware, that:
refers to a storage unit storing a plurality of existing pairs of an output data item and an input data item connectable to each other, the plurality of existing pairs being extracted from a service combination definition that defines a data flow among a plurality of web services connectable to one another and that does not include data type information of output data items and input data items in the plurality of existing pairs;
determines whether or not a data type of an output data item in a first pair corresponds to a data type of an input data item in a second pair using a first inference rule and a second inference rule, the first pair and the second pair being included in the plurality of existing pairs, the plurality of existing pairs not including a pair of the output data items in the first pair and the input data item in the second pair, the first inference rule specifying that output data items associated with the same input data item by the service combination definition correspond to each other, the second inference rule specifying that input data items associated with the same output data item by the service combination definition correspond to each other; and generates a new pair that has not been defined in the service combination definition and that is formed with the output data item in the first pair and the input data item in the second pair when determining that the data types correspond to each other, wherein in a first case the data type of the output data item in the first pair corresponds to the data type of the input data item in the second pair, and in a second case the data type of the output data item does not correspond to the data type of the input data item.

2. The service combination support apparatus according to claim 1, wherein said data item relationship inferring unit determines that the data types of the output data item in the first pair and the input data item in the second pair correspond to each other when determining that a data type of an output data item in a third pair included in the plurality of existing pairs and the data type of the output data item in the first pair correspond to each other based on the first inference rule and that a data type of an input data item in the third pair and data type of the input data item in the second pair correspond to each other based on the second inference rule.

3. The service combination support apparatus according to claim 1, further comprising:

a data flow analyzing unit that extracts, from the service combination definition, a first web service on a transmission side, a second web service on a reception side and each data attribute in the first web service and the second web service for data to be transmitted and received in the data flow defined by the service combination definition; and a data item relationship storage unit that associates the output data item including transmitter information indicating the first web service extracted by said data flow analyzing unit and the data attribute in the first web service with the input data item including recipient information indicating the extracted second web service and the data attribute in the second web service, and stores the output data item and the input data item as one of the plurality of existing pairs.

4. The service combination support apparatus according to claim 1, wherein said data item relationship inferring unit retrieves a specific pair including at least one of a designated specific output data item and a designated specific input data item from the plurality of existing pairs, and generates the new pair from the retrieved specific pair.

5. The service combination support apparatus according to claim 4, wherein said data item relationship inferring unit assigns a same data type number to the output data item and the input data item associated with each other by the service combination definition, the input data items that correspond to each other based on the first inference rule, or the output data items that correspond to each other based on the second inference rule among the output data items and the input data items forming the plurality of existing pairs, stores, into an inference result storage unit, the output data item or the input data item to which the data type number is assigned, and generates, as the new pair, a pair that is formed with the output data item to which a designated specific data type number is assigned, and the input data item to which the specific data type number is assigned, among the output data items and the input data items stored in said inference result storage unit.

6. The service combination support apparatus according to claim 5, wherein said data item relationship inferring unit reads the output data items and the input data items stored in said inference result storage unit, and replaces one of different data type numbers with another one of the different data type numbers when there are the same input data items or the same output data items to which the different data type numbers are assigned among the read output data items and the read input data items.

7. The service combination support apparatus according to claim 1, further comprising:

a service combination proposing unit that inputs an input data item or an output data item for which a connection destination is not defined, and acquires, from said data item relationship inferring unit, the new pair including any one of the input data item and the output data item that are input.

8. The service combination support apparatus according to claim 1, further comprising:

a service combination proposing unit that extracts all input data items and all output data items defined by the service combination definition, acquires the new pair including any one of the extracted all input data items and the extracted all output data items from said data item relationship inferring unit, and outputs the acquired new pair.

9. A service combination support method comprising:

referring, by a computer, to a storage unit storing a plurality of existing pairs of an output data item and an input data item connectable to each other, the plurality of existing pairs being extracted from a service combination definition that defines a data flow among a plurality of web services connectable to one another and that does not include data type information of output data items and input data items in the plurality of existing pairs;

determining, by the computer, whether or not a data type of an output data item in a first pair corresponds to a data type of an input data item in a second pair using a first inference rule and a second inference rule, the first pair and the second pair being included in the plurality of existing pairs, the plurality of existing pairs not including a pair of the output data items in the first pair and the input data item in the second pair, the first inference rule specifying that output data items associated with the same input data item by the service combination definition correspond to each other, the second inference rule specifying that input data items associated with the same output data item by the service combination definition correspond to each other; and generating, by a computer, a new pair that has not been defined in the service combination definition and is formed with the output data item included in the first pair and the input data item included in the second pair when determining that the data types correspond to each other, wherein in a first case the data type of the output data item in the first pair corresponds to the data type of the input data item in the second pair, and in a second case the data type of the output data item does not correspond to the data type of the input data item.

10. The service combination support method according to claim 9, wherein,
said generating the new pair includes determining that the data types of the output data item in the first pair and the input data item in the second pair correspond to each other when determining that a data type of an output data item in a third pair included in the plurality of existing pairs and the data type of the output data item in the first pair correspond to each other based on the first inference rule, and that a data type of an input data item in the third pair and the data type of the input data item in the second pair correspond to each other based on the second inference rule.

11. The service combination support method according to claim 9, wherein
said generating the new pair includes retrieving a specific pair including at least one of a designated specific output data item and a designated specific input data item from the plurality of existing pairs and generates the new pair from the retrieved specific pair.

12. A non-transitory computer-readable storage medium storing a program for causing a computer to perform the following operation:
a data item relationship inferring operation to:
refer to a storage unit storing a plurality of existing pairs of an output data item and an input data item connectable to each other, the plurality of existing pairs being extracted from a service combination definition that defines a data flow among a plurality of web services connectable to one another and that does not include data type information of output data items and input data items in the plurality of existing pairs;
determine whether or not a data type of an output data item in a first pair corresponds to a data type of an input data item in a second pair using a first inference rule and a second inference rule, the first pair and the second pair being included in the plurality of existing pairs, the plurality of existing pairs not including a pair of the output data items in the first pair and the input data item in the second pair, the first inference rule specifying that output data items associated with the same input data item by the service combination definition correspond to each other, the second inference rule specifying that input data items associated with the same output data item by the service combination definition correspond to each other; and
generate a new pair that has not been defined in the service combination definition and that is formed with the output data item in the first pair and the input data item in the second pair when determining that the data types correspond to each other,
wherein in a first case the data type of the output data item in the first pair corresponds to the data type of the input data item in the second pair, and in a second case the data type of the output data item does not correspond to the data type of the input data item.

13. The storage medium according to claim 12, wherein
said data item relationship inferring operation includes determining that the data types of the output data item in the first pair and the input data item in the second pair correspond to each other when determining that a data type of an output data item in a third pair included in the plurality of existing pairs and the data type of the output data item in the first pair correspond to each other based on the first inference rule and that a data type of an input data item in the third pair and the data type of the input data item in the second pair correspond to each other based on the second inference rule.

14. The storage medium according to claim 12, wherein
said data item relationship inferring operation includes extracting a pair including at least one of the specific output data item and the specific input data item from the plurality of existing pairs to generate the new pair.

* * * * *